(12) United States Patent
Mann et al.

(10) Patent No.: US 10,603,723 B1
(45) Date of Patent: Mar. 31, 2020

(54) MACHINING SYSTEM SPINDLE FOR MODULATION-ASSISTED MACHINING

(71) Applicant: M4 Sciences, LLC, West Lafayette, IN (US)

(72) Inventors: James B Mann, West Lafayette, IN (US); Yang Guo, West Lafayette, IN (US); Seong Eyl Lee, West Lafayette, IN (US)

(73) Assignee: M4 Sciences, LLC, Lafayette, IN (US)

( * ) Notice: Subject to any disclaimer, the term of this patent is extended or adjusted under 35 U.S.C. 154(b) by 317 days.

(21) Appl. No.: 15/249,381

(22) Filed: Aug. 27, 2016

Related U.S. Application Data

(60) Provisional application No. 62/210,649, filed on Aug. 27, 2015.

(51) Int. Cl.
*B23B 37/00* (2006.01)
*B23Q 11/10* (2006.01)
*B23B 29/12* (2006.01)

(52) U.S. Cl.
CPC ............ *B23B 37/00* (2013.01); *B23B 29/125* (2013.01); *B23Q 11/1023* (2013.01); *B23B 2231/24* (2013.01); *B23B 2250/12* (2013.01)

(58) Field of Classification Search
CPC . B23Q 11/1053; B23Q 11/1023; B23B 37/00; B23B 29/02; B23B 29/125; B23B 2231/22; B23B 2231/24; B23B 2250/04; B23B 2250/12
USPC ....... 173/1, 2, 130, 148, 164, 176, 179, 183, 173/217
See application file for complete search history.

(56) References Cited

U.S. PATENT DOCUMENTS

| | | | | | |
|---|---|---|---|---|---|
| 2,712,254 A | * | 7/1955 | Schodeberg | .......... | B25B 21/007 173/93.6 |
| 4,098,354 A | * | 7/1978 | Alcenius | ............... | B25B 21/007 173/93.5 |
| 4,416,570 A | * | 11/1983 | Argenbright | ............. | B23Q 1/48 269/296 |
| 4,940,410 A | * | 7/1990 | Apap | ....................... | A61C 1/07 433/102 |
| 5,372,568 A | * | 12/1994 | Matsuoka | ............. | B23B 31/263 483/56 |
| 6,550,546 B2 | * | 4/2003 | Thurler | .................. | B25D 16/00 173/109 |
| 7,547,169 B1 | * | 6/2009 | Zagar | .................... | B23B 31/263 33/639 |

(Continued)

*Primary Examiner* — Robert F Long
(74) *Attorney, Agent, or Firm* — Indiano Law Group, LLC; E. Victor Indiano; James T. Woods, III

(57) ABSTRACT

A modulating tool holder includes a tool holder first end and a tool holder second end, and a central axis extending between the tool holder first end and the tool holder second end. The tool holder first end has a coupler for coupling the tool holder to a drive member of a machining device and the second end includes a clamp for releasably holding either a tool or a workpiece. A rotatable spindle member extends axially in the tool holder and imparts a rotational movement to the clamp. A central fluid passageway extends between first and second ends of the rotatable spindle member for conveying a fluid. A linear actuator is configured to impart an oscillating movement to the clamp. The linear actuator is functionally decoupled from the torsional load of the rotatable spindle member.

22 Claims, 4 Drawing Sheets

(56) References Cited

U.S. PATENT DOCUMENTS

| | | | | |
|---|---|---|---|---|
| 7,587,965 B2* | 9/2009 | Mann | ................ | B23B 25/02 |
| | | | | 184/6.1 |
| 7,617,750 B2* | 11/2009 | Moscoso | ............... | B21C 23/001 |
| | | | | 82/1.11 |
| 7,628,099 B2* | 12/2009 | Mann | ................ | B22F 9/04 |
| | | | | 148/308 |
| 7,895,872 B2* | 3/2011 | Mann | ................ | B21C 23/001 |
| | | | | 148/559 |
| 8,157,021 B2* | 4/2012 | Chen | ................ | B23B 31/1071 |
| | | | | 173/29 |
| 8,371,394 B2* | 2/2013 | Grand | ................ | B25B 21/02 |
| | | | | 173/29 |
| 8,694,133 B2* | 4/2014 | Mann | ................ | B23B 29/125 |
| | | | | 700/160 |
| 2009/0003947 A1* | 1/2009 | Haimer | ................ | B23B 29/12 |
| | | | | 408/143 |
| 2012/0107062 A1* | 5/2012 | Moraru | ................ | B23B 29/125 |
| | | | | 408/17 |
| 2014/0241821 A1* | 8/2014 | Mann | ................ | B23B 37/00 |
| | | | | 408/17 |
| 2016/0001409 A1* | 1/2016 | Watford | ................ | B25F 5/001 |
| | | | | 173/1 |
| 2016/0226337 A1* | 8/2016 | Rudy | ................ | B23B 31/261 |
| 2017/0197305 A1* | 7/2017 | Rastegar | ................ | B25F 3/00 |

\* cited by examiner

MACHINING SYSTEM SPINDLE FOR MODULATION-ASSISTED MACHINING

PRIORITY STATEMENT

This non-provisional patent application claims benefit of priority to James B. Mann, Yang Guo and Seong Eyl Lee, U.S. Provisional Patent Application No. 62/210,649 that was filed on 27 Aug. 2015, and is fully incorporated herein by reference.

TECHNICAL FIELD OF THE INVENTION

The present invention relates to tool holder assemblies, and more particularly, to a tool holder assembly that is capable of moving a tool or work piece, as appropriate, in both a linear and rotational manner simultaneously.

BACKGROUND OF THE INVENTION

The term machining refers to any one of a variety of processes in which a piece of raw material (a "workpiece") is cut into a desired, final shape and sized by a controlled material removal process. In a typical machining process, one has a machine that includes a driver that induces usually a rotary motion or a linear motion to a tool. The tool then engages a work piece upon which the machining operation is to be performed. The engagement of the tool with the workpiece causes material to be removed from the workpiece.

In most cases, a rotary electric motor is coupled to a tool to move the tool in a rotary manner so that sharp edges formed on the tool, can cut into and through, the material of the workpiece.

Machining operations as described above have been in common use in industry for quite some time.

A tool holder is interposed between the driving motor and the cutting tool to couple the cutting tool to the driving motor. Typically, a tool holder has a first end that is coupled to the electric rotator, that may comprise a small electric motor (or a shaft of some sort), and a second end which holds the tool itself. The second end of the tool holder is usually designed to removably receive the cutting tool so that cutting tools can be conveniently coupled to and removed from the holder.

The most common type of machining is a milling operation wherein a machining device is used to rotate a cutting tool to cause the cutting edges of the tool to bear against a workpiece. Additionally, drilling operations are another type of machining operation in which holes are produced or refined by bringing a rotating cutter with cutting edges at the lower extremity into contact with the workpiece.

A different type of machining operation is a turning operation. A turning operation differs from a milling operation. A turning operation normally involves the workpiece being rotated rather than the cutting tool being rotated.

In earlier applications that are also assigned to the assignee of the instant invention, tool holders and assemblies and methods of modulation were disclosed that incorporated a linear, back-and-forth type oscillating movement into an otherwise rotary machining operation, so that the workpiece, would not only rotate with respect to the cutting tool, but would move in a linear fashion with regard to the cutting tool. In this regard, the reader's attention is directed to James B. Mann et al., U.S. Pat. Nos. 7,587,965; 7,628,099; 7,895,872; 7,617, 750; and 8,694,133.

The above patents disclose that modulation tool holder assemblies and methods of modulation involving a combination of linear and rotational movement of a workpiece can improve machining performance and/or create machine chip particles with controlled size and shape. The systems described in the above-referenced patents help to demonstrate the modulated cutting velocity or undeformed chip thickness can benefit the machining operations.

The devices described above disclose the use of stationary system for modulation that involved the rotation of the workpiece. These systems have demonstrated remarkable success in the ease of installation for processes where undeformed chip thickness is modular. The process relies on a linear oscillation motion that is super imposed on a non-rotating system. Another publication of interest is James B. Mann et al., U.S. Published Patent Application No. 2014/0241821 that discloses a tool holder that is capable of modulated movement in a rotating spindle. All of the above referenced Mann patents and publications are incorporated fully by reference into this instant application.

Although the device described in the '821 Published Application performs its function in a workmanlike manner, room for improvement exists. In particular, the device shown in the '821 application is somewhat complicated to install into an existing machine, and may require a range of modifications to the machine tool.

The above described device does provide some difficulties, when used on systems that rely on automated systems for tool changing, because the linear actuator or electrical power occurs across a rotating system.

One object of the present invention is to provide a device that improves over the devices described above.

SUMMARY OF THE INVENTION

A modulating tool holder is provided for holding one of a tool or workpiece. The tool holder is mountable to a driving member of a machining device. The tool holder includes a housing, a tool holder first end, tool holder second end and a central axis extending between the tool holder first end and the tool holder second end. The tool holder first end includes a coupler for coupling the tool holder to the driving member of the machining device. The tool holder second end includes a clamp for releasably holding the one of the tool and work piece.

A rotatable spindle member extends generally axially in the tool holder and is functionally coupled to the clamp for imparting a rotational to the movement of the clamp. The rotatable spindle member includes a spindle first end disposed relatively closer to the tool holder first end and a spindle second end disposed relatively closer to the tool holder second end. The rotatable spindle member also includes an axial extending central fluid passageway that extends between the spindle shaft first end and the spindle shaft second end. A linear actuator is disposed radially exteriorly of the rotating spindle shaft member, and is functionally coupled to the clamp for imparting an oscillating linear movement to the clamp.

The linear actuator and rotatable spindle member are configured for together simultaneously imparting both the rotational and oscillating linear movement to the clamp.

In a preferred embodiment, the device also includes a shaft member that is functionally coupled to the linear movement by the linear actuator, and a biasing member that is coupled to the shaft member for exerting a force against a shaft member.

Most preferably, a shaft member is provided that is functionally coupled between the linear actuator and the clamp for reducing the imposition of torsion loads upon the linear actuator. A rotary assembly is also preferably provided that is functionally coupled between the shaft and the clamp to impart the linear movement of the shaft member to the clamp.

One feature of the present invention is that it includes a design that is believed to overcome a deficiency of previous modulation tool holders or rotating systems. The present invention is capable of adapting a superimposed linear motion on a rotating cutting tool or workpiece and enables the linear motor power to be transferred across a stationary interface. Preferably, the present invention includes a series of linear ball-spline bearing and rotary ball-spline bearing assemblies that are adapted with a pre-loaded linear actuator in a modulating spindle assembly. The spindle assembly design can be adapted to be coupled directly to the main rotating spindle of an existing machine or motor to: (1) superimpose a modulated linear motion onto the rotary motion of a tool or workpiece without any machine modifications; (2) superimpose a modulated linear motion to a non-rotating cutting tool or workpiece without any machine modifications; or (3) be incorporated into the design and construction of the primary spindle of a machine to include both the rotary motion and a superimposed linear motion directly to the machine tool.

The superimposed modulated motion of the cutting tool or workpiece enables modulation of the material removal by controlling the undeformed chip thickness in a machining process. A particularly useful example is in drilling operations where the superimposed linear motion in the form of a sinusoidal oscillation can convert an otherwise continuous machining process into a series of discrete cutting events as described in the Mann patents and patent applications listed above.

While the system design of the present invention is intended for use in modulated machining, the device can also be operated in a conventional machining mode by operating the system with the linear actuator not powered or by removing or disabling operation of the linear actuator.

Preferably, the electro-mechanical aspects of the device of the present invention can be powered through a direct wire connection to an external controller. The external controller sends the appropriate power signal to the linear actuator to enable the effective modulation function for improved machining processes as described in the Mann patents and patent applications listed above.

DETAILED DESCRIPTION OF THE DRAWINGS

Figure 1:
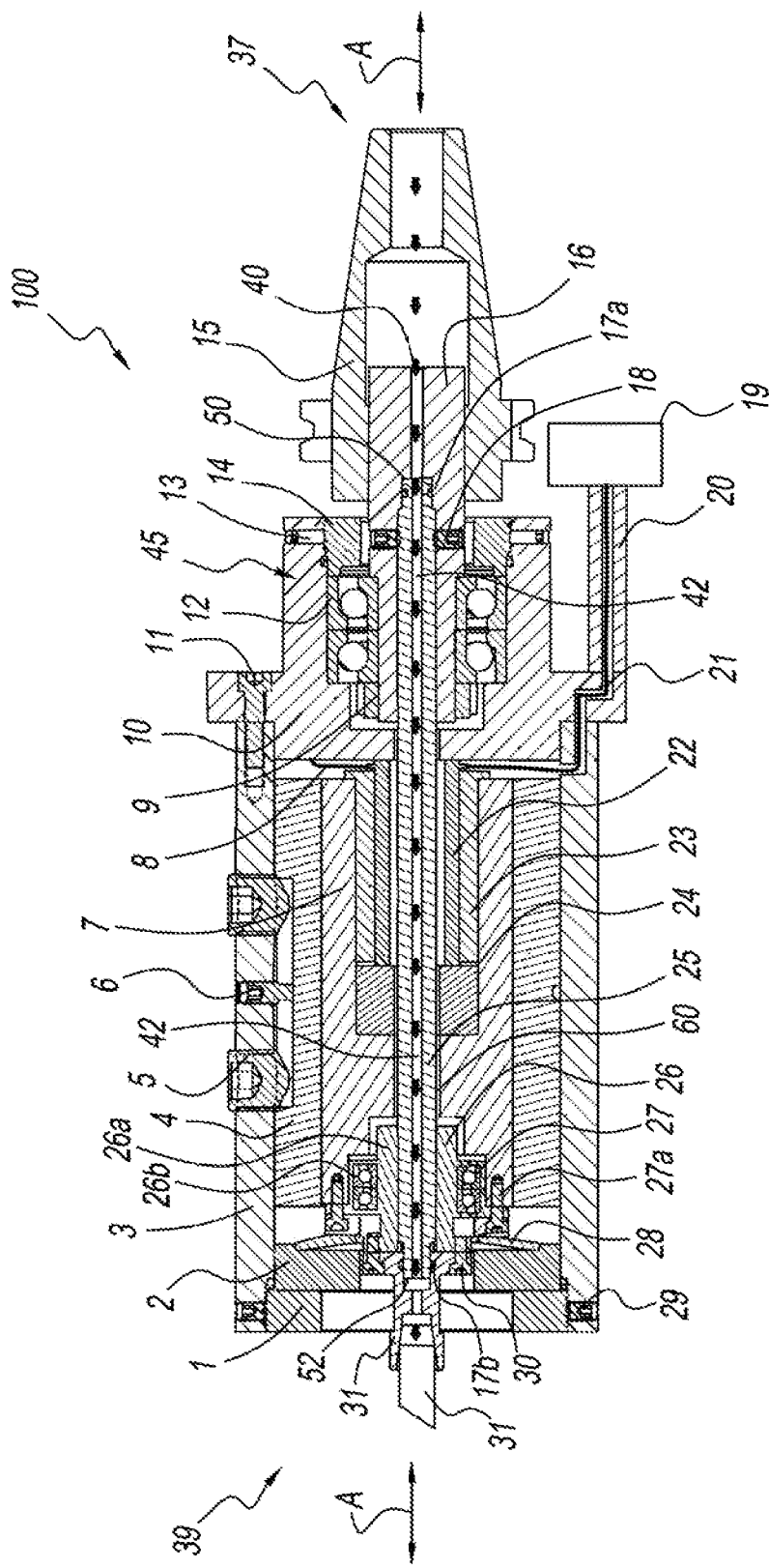
FIG. 1 is a sectional view of a first embodiment of the machining system and tool holder of the present invention.

The present invention discloses machining system designs and methods of modulation that can enable the direct implementation of modulated material removal in machining operations. FIGS. 1, 2, 3, and 4 show embodiments of the machining system for modulation-assisted machining. The systems are primarily described by axisymmetric configurations; however, asymmetric configurations are possible depending on the configuration of certain elements of the system The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles.

The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing reference numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Furthermore, certain views are side or sectional views which depict only one side of the device (or one set of components of a multi set array of components), but it will be understood that the opposite side and other component sets are preferably identical thereto. The present specification is intended to be taken as a whole and interpreted in accordance with the principles of the present invention as taught herein and understood by one of ordinary skill in the art.

The modulating tool holder (100) is provided for holding one of a tool or workpiece (32). The tool holder (100) is configured for being mounted to a driving member (not shown) for a machining device. The tool holder (100) includes a housing (3), a tool holder first end (37), tool holder second end (39) and a central axis (A) extending between the tool holder first end (37) and the tool holder second end (39). The tool holder first end (37) includes a coupler (15) for coupling the tool holder (100) to the driving member of the machining device. The tool holder second end (39) includes a clamp (31) for releasably holding the one of the tool and work piece (32).

A rotatable spindle member (25), which is depicted as a rotating spindle spline shaft 25, extends generally axially in the tool holder (100) and is functionally coupled to the clamp (31) for imparting a rotational movement to the clamp (31). The rotating spindle spline shaft (25) includes a spindle first end (50) disposed relatively closer to a tool first end (37) and a spindle second end (52) disposed relatively closer to the tool second end (39). The rotating spindle spline shaft (25) also includes an axial extending central fluid passageway (42) that extends between the spindle shaft first end (50) and the spindle shaft second end (39). A linear actuator (22) is disposed radially exteriorly of the rotating spindle spline shaft (25), and is functionally coupled to the clamp (31) for imparting an oscillating linear movement to the clamp (31).

The linear actuator (22) and rotating spindle spline shaft (25) are configured for together simultaneously imparting both the rotational and oscillating linear movement to the clamp (31) and hence to the tool (32) or workpiece (32) attendant thereto.

In a preferred embodiment, the tool holder (100) also includes a non-rotating shaft member depicted main body ball-spline shaft (7) that is functionally coupled to the linear actuator (22) for linear movement by the linear actuator (22), and a biasing member (28) that is coupled to the main body ball-spline shaft (7) for exerting a compressive pre-load force against the main body ball-spline shaft (7).

Most preferably, the main body ball-spline shaft (7) is functionally coupled between the linear actuator (22) and the clamp (31) for de-coupling torsion loads between the rotating spindle spline shaft (25) and the linear actuator (22). A rotary bearing assembly (26) is also preferably provided that is functionally coupled between the main body ball-spline shaft (7) and the clamp (31) to impart the linear movement of the main body ball-spline shaft (7) to the clamp (31).

The tool holder (100), which is depicted as a spindle assembly, shown in FIG. 1 includes a cylindrical axisymmetric, stationary main body housing (3) that contains a main body ball-spline bearing assembly comprised of a bearing nut (4) and main body ball-spline shaft (7). The bearing nut (4), which can be a ball-spline bearing nut, is clamped into the stationary housing (3) by two radially extending screws (5) located one side of the housing (3). The main body ball-spline bearing assembly is lubricated through a grease port (6).

Figure 2:
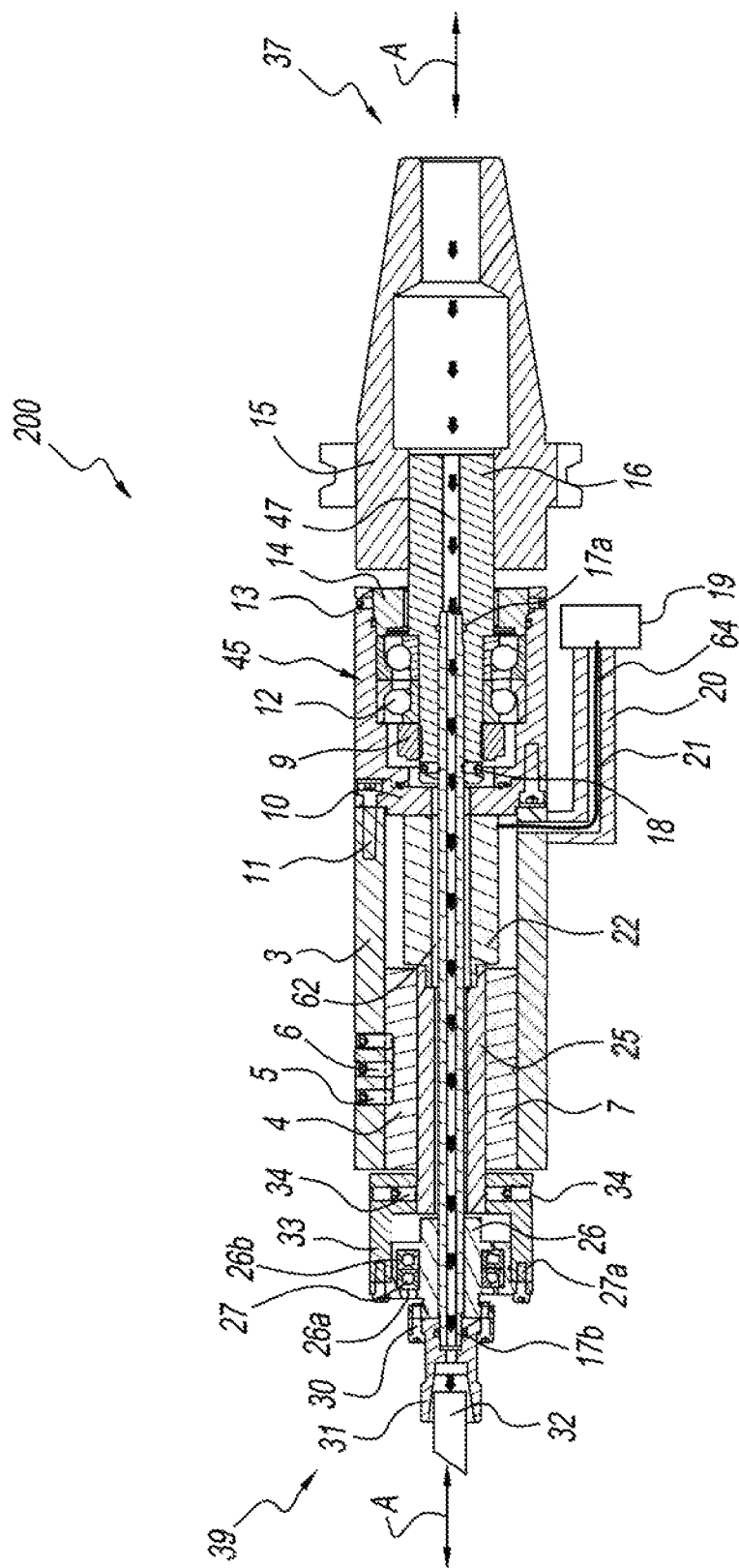
FIG. 2 is a first sectional view of a first alternate embodiment machining system of the present invention.
Figure 3:
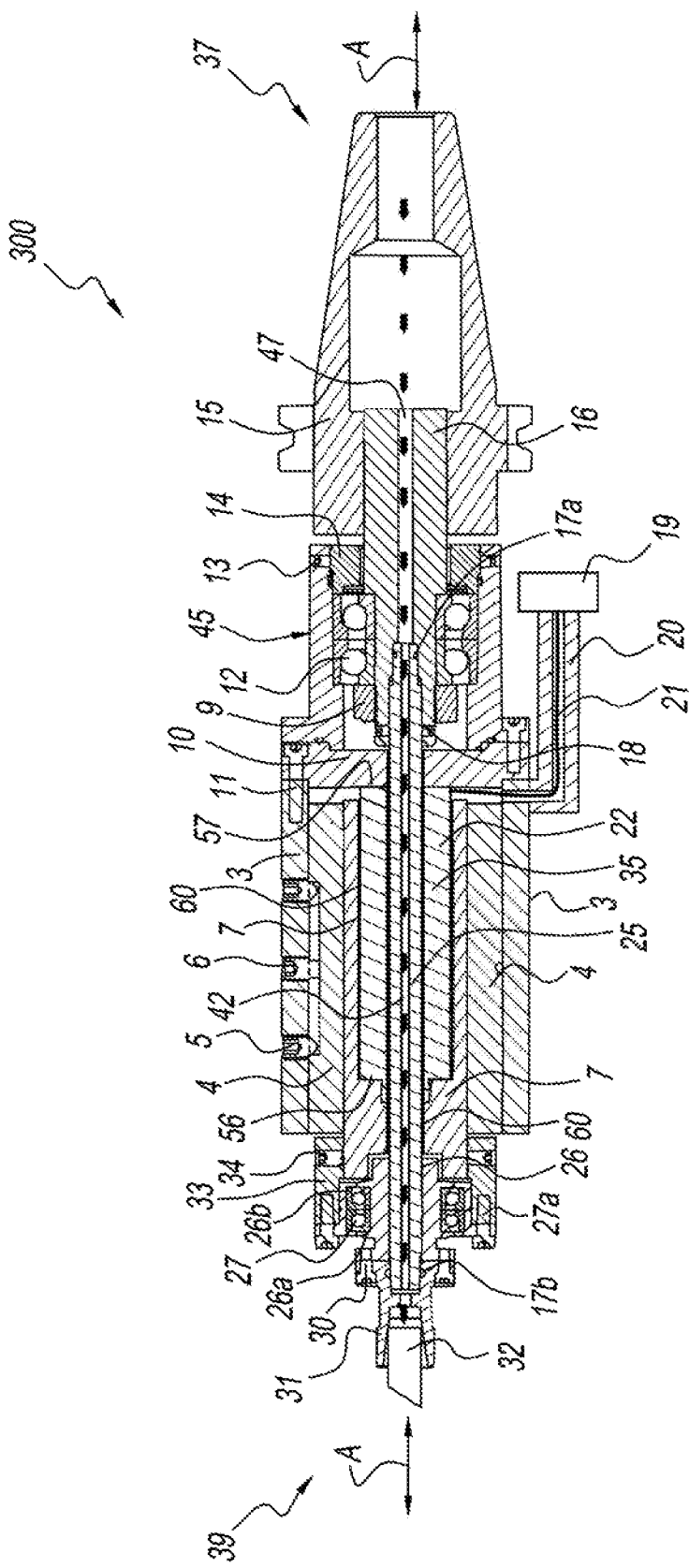
FIG. 3 is a sectional view of a second alternate embodiment machining system of the present invention.

In the form depicted in FIGS. 1-3, the linear actuator 22 can include a cylindrical shape. The linear actuator (22) is movable in an axially oscillating manner to impart linear motion to the main body ball-spline shaft (7). A rotating spindle spline shaft (25) extends through a central bore (62) of the main body ball spline shaft (7), and is rotatably movable within the bore (62), and relative to the main body spline shaft (7). The rotating spindle spline shaft is preferably positioned along the central axis of the tool holder (100).

The main body ball-spline shaft (7) decouples any torsion loads to the linear actuator (22). The linear actuator (22) can be a piezo-electric actuator, linear motor, magnetostrictive actuator, or similar electric actuator, or alternately, may be another type of linear actuator. The linear actuator (22) may also include an internal sensor to transmit feedback signals between the linear actuator (22) and external controller.

The linear actuator (22) is protected by an insulator shield (23) and housed inside the bore 62 of the main body ball-spline shaft (7). The linear actuator (22) has a second end 56 that is positioned at one end against a contact ring (24) to distribute and transmit the linear displacement from the linear actuator (22) to the inside bore of the main body ball-spline shaft (7). The first end (57) of the linear actuator (22) contacts the end face (10) of a thrust bearing housing (45) which is rigidly fastened to the main body cylindrical housing (3) by a series of annular screws (11).

The linear actuator (22) allows the rotating spindle spline shaft (25) to pass through a bore or passageway (66) in the linear actuator (22) and a bore (62) that extends through the main body ball-spline shaft (7). The passageway 60 is sized so that the rotation of the rotating spindle spline shaft (25) is independent from the linear motion imparted by the linear actuator (22) to the main body ball-spline shaft (7). A pair of angular thrust bearings (27) and linkages in a rotary ball-spline assembly (26) connect both an inner rotating/translating section 26a and an outer translating/non-rotating section (26b) of the rotary ball-spline assembly (26). The rotation of inner rotating/translating (26b) section of the rotary ball spline assembly (26) is driven by the rotating spindle spline shaft (25).

The outer non-rotating/translating section of the rotary ball-spline assembly (26) is fastened directly to the main body ball-spline shaft (7) by a series of annular screws (27a). Through the connection made by the screws (27a), the rotary ball-spline bearing assembly (26) couples the rotation of the rotating spindle spline shaft (25) to the linear motion of the main ball-spline shaft (7). Thus, the motion (linear displacement) that is caused by the linear actuator (22) on the main ball-spline shaft (7) is superimposed onto the rotary motion of the rotating spindle spline shaft (25) at the rotary ball-spline bearing assembly (26).

This superimposition of the linear motion of the linear actuator (22) on to the rotating motion of the rotating spindle shaft (25) enables simultaneous rotation and linear motion of a cutting tool or work material (32) held by a clamp (31). The clamp (31) is fixedly connected to the rotating/translating inner section (26a) of the rotary ball-spline assembly (26) by a series of annular screws (30). The translating/non-rotating outer section (26b) of the rotary ball-spline assembly (26) is pre-loaded in compression by a spring washer (28) that is held in position by the compression disk (2). The compressive pre-load is transmitted to the linear actuator (22), and the linear actuator (22) operates continuously under a compressive load to prevent tension loads from occurring on the linear actuator (22).

The compression disk (2) is aligned to the inside bore of the main body housing (3) and adjusted to compress the spring washer (28) by a seating ring (1) that is threaded into the main body housing (3). As illustrated, the seating ring (1) is depicted as a threaded ring. The pre-load compression is adjusted by positioning the seating ring (1) against the compression disk (2), adjusting the compression by compressing the spring washer (28), and locking the seating ring (1) into position with screw locks (29) located 180 degrees apart in the main body housing (3).

Rotation of the main body housing (3) is prevented by a torque arm (20) that is rigidly connected to the main body housing (3). The torque arm (20) is coupled against a fixed block (19) that is rigidly mounted to a fixed machine element (not shown). The torque arm prevents any rotary motion of the main body housing (3). Translational movement of the main body housing (3) is prevented by a thrust bearing housing (45) that is fastened to the main body housing (3) with a series of annular screws (11).

The thrust bearing housing (45) contains an opposing pair of angular thrust bearings (12) that are pre-loaded to prevent any linear translation of the thrust bearing housing (45). The thrust bearing bearings (12) are pressed over the spindle driver shaft (16) and held in their proper position by the clamp ring (9) and the seating cap (14). The seating cap (14) is threaded into the thrust bearing housing (45) to remove clearance between the pair of angular contact bearings (12) and the clamp ring (9).

The spindle driver shaft (16) transmits rotary motion (torque) to the axial rotating spindle spline shaft (25). The spindle driver shaft (16) is fixedly connected to the rotating spindle spline shaft (25) by two mounting screws (18) located 180 degrees apart. In the tool holder (100), the spindle driver shaft (16) is clamped directly to a rotating machine adapter (15). The machine adapter (15) can be mounted to the mating feature of a rotating spindle of a machine or other motor driver.

The tool holder (100) includes provisions for the application of pressurized cutting fluids through the system by an axially extending central passageway 40 in the spindle driver shaft (16) and along the axis of the rotating spindle spline shaft (25) in a coaxially disposed axially extending central fluid passageway (42) as depicted by the solid arrows along the axis of the rotating spindle spline shaft (25). The rotating spindle spline shaft (25) is sealed with o-rings (17a) and (17b) to allow for application of pressurized cutting fluids to pass therethrough. The linear actuator (22) is powered by an electrical and/or communication cable (21) and electrically grounded to the thrust bearing housing (45) by a grounding wire (8). The electrical and/or communication cable (21) is routed through a stationary torque arm (20) attached to the main body housing (3) of the spindle system. The stationary arm (20) which also serves as a torque arm also provides a connection for supply of external compressed air that can be used to cool or internally pressurize the spindle assembly.

The spindle assembly (200) shown in FIG. 2 shows a cylindrical axisymmetric, stationary main body housing (3) that contains a main body ball-spline bearing assembly comprised of a bearing nut (4) and main body ball-spline shaft (7) coupled to a linear actuator (22). The bearing nut (4), which can be a ball-spline bearing nut, is clamped into the stationary housing (3) by two screws (5) located on one side of the housing. The main body ball-spline bearing assembly is lubricated through grease port (6).

A linear actuator (22) is housed in an axial bore (62) of the main body ball-spline shaft (7). The main body ball-spline shaft (7) prevents any significant torsion loads from being imposed on the linear actuator (22). The linear actuator (22) allows the rotating spindle spline shaft (25) of the assembly to pass through the linear actuator (22) along the central axis.

The linear actuator (22) can be a piezo-electric actuator, linear motor, magnetostrictive actuator, or similar electric motor. The linear actuator (22) may also include an internal sensor to transmit feedback signals between the linear actuator (22) and external controller. The linear actuator (22) may be housed in a casing and internally pre-loaded, so that it operates continuously in compression to prevent tension loads from occurring on the linear actuator (22).

The linear actuator (22) has a second end (56) coupled to the main body ball-spline shaft (7) and a first end (57) coupled to the main body end-cap (10) of the thrust bearing housing (45). The linear actuator (22) includes a central passageway (60) for receiving the rotating spindle spline shaft (25). The rotating spindle spline shaft (25) to pass through a central passageway (60) of the linear actuator (22) and also through a central bore (62) in main-body ball-spline shaft (7). The passageway (60) and bore (62) are sized to allow the rotating spindle spline shaft (25) to freely rotate therein, thereby separating the rotational motion of the rotating spindle spline shaft (25) from the linear motion imparted by the linear actuator (22).

A pair of angular thrust bearings (27) and linkages in a rotary ball-spline assembly (26) connect both an inner rotating/translating section 26a and an outer non-rotating/translating section (26b) of the rotary ball-spline assembly (26).

The rotation of the inner rotating/translating section (26a) of the rotary ball spline assembly (26) is driven by the rotating spindle spline shaft (25). Then, the rotary ball-spline bearing assembly (26) couples the rotation of the rotating spindle spline shaft (25) to the linear motion of the main body ball-spline shaft (7), and the motion (linear displacement) from the linear actuator (22) is superimposed onto the rotary motion of the rotating spindle spline shaft (25).

This embodiment (200) shown in FIG. 2 enables simultaneous rotation and linear motion of a tool or work material held by a clamp (31). The clamp (31) is rigidly connected to the rotating/translating inner section (26a) of the rotary ball-spline assembly (26) by a series of annular screws (30). The translating/non-rotating outer section (26b) of the rotary ball-spline bearing assembly (26) is rigidly connected to the main body ball-spline shaft (7) by a shaft coupling (33). The shaft coupling (33) is clamped to the main body ball-spline shaft (7) by two screws (34) located 180 degrees apart. The translating/non-rotating section 26b of the rotary ball-spline bearing assembly (26) is fastened to the shaft coupling (33) by a series of annular screws (27a).

The rotation of the main body housing (3) is prevented by a torque arm (20) that is rigidly connected to the main body housing (3). The torque arm (20) is coupled to a fixed block (19) that is rigidly mounted to a fixed machine element. The torque arm (20) prevents any rotary motion of the main body housing (3).

Translational movement of the main body housing (3) is prevented by a thrust bearing housing (45) that is fastened to the main body housing (3) by a series of annular screws (11).

The thrust bearing housing (45) contains an opposing pair of angular thrust bearings (12) that are pre-loaded to prevent any significant linear translation of the-thrust bearing housing (45). The thrust bearing bearings (12) are pressed over the spindle driver shaft (16) and held in the appropriate position by the clamp ring (9) and the seating cap (14). The seating cap (14) is threaded into the thrust bearing housing (45) to remove clearance between the pair of angular contact thrust bearings (12) and the clamp ring (9).

The spindle driver shaft (16) transmits rotary motion (torque) to the rotating spindle spline shaft (25). The spindle driver shaft (16) is fixedly connected to the rotating spindle spline shaft (25) by two mounting screws (18) located 180 degrees apart. The spindle assembly spindle driver shaft (16) is clamped directly to a rotating machine adapter (15). The machine adapter (15) can be mounted to the mating feature of a rotating spindle in a machine or other motor driver.

The spindle assembly (300) includes provisions for the application of pressurized cutting fluids through the system by an axially extending central passageway (47) in the spindle driver shaft (16) and coaxially positioned, extending central passageway (47) that extends along the axis of the rotating spindle spline shaft (25) as depicted by the solid arrows along the axis of the rotating spindle spline shaft (25).

The rotating spindle spline shaft (25) is sealed for application of pressurized cutting fluids using o-rings (17a) and (17b). The linear actuator (22) is grounded internally and connected to an external controller by an electrical and/or communication cable (21). The electrical and/or communication cable (21) is routed through an internal passageway (64) in the stationary torque arm (20) that is fixedly coupled to the main body housing (3) of the spindle system. This passageway (64) is stationarity positioned and configured for conducting the electrical/communications cable from a position exterior of the housing to the linear actuator (22) without crossing, contacting or engaging any rotating members or surfaces. The stationary torque arm (20) also provides a passageway (64) through which a supply of external compressed air can be passed that can be used to cool or internally pressurize the spindle assembly.

The spindle assembly (300) shown in FIG. 3 displays the cylindrical axisymmetric, stationary main body housing (3) that contains a main body ball-spline bearing assembly comprised of a bearing nut (4) and main body ball-spline shaft (7). The bearing nut (4), which can be a ball-spline bearing nut, is clamped into the stationary housing (3) by two radially extending screws (5) located on one side of the housing. The main body ball-spline bearing assembly is lubricated through a grease port (6). The main body ball-spline shaft (7) is coupled to a linear actuator (22). The linear actuator (22) includes a second end (56) coupled to the main body ball-spline shaft and first end (57) that is connected to the end-face (10) of a thrust bearing housing (45).

Thrust bearing housing (45) is fastened to the main body cylindrical housing (3) by a series of annular screws. The main body ball-spline shaft (7) prevents any significant torsion loads from being loaded on to the linear actuator (22). The linear actuator (22) allows the rotating spindle spline shaft (25) of the assembly to pass through a central passageway (60) located along the central axis of the linear actuator (22).

The linear actuator (22) can be a piezo-electric actuator, linear motor, magnetostrictive actuator, or similar electric motor or other linear actuator type. The linear actuator (22) may also include an internal sensor to transmit feedback signals between the linear actuator (22) and external controller. The linear actuator (22) may be housed in a casing and internally pre-loaded, so that it operates continuously in compression to prevent tension loads from occurring on the linear actuator (22).

A first, second end (56) of the linear actuator (22) is coupled to the main body ball-spline shaft (7). The second end (56) of the linear actuator (22) is attached to the main body ball-spline shaft (7) and the first end (57) of the linear actuator (22) is attached to the main body end-cap (10) of the thrust bearing housing (45).

The linear actuator (22) includes an axial central passageway 60 that allows the rotating spindle spline shaft (25) to pass through the linear actuator (22). The rotating spindle spline shaft (25) also extends through a bore (62) that extends through the main-body ball-spline shaft (7). Bore (62) and passageway (60) cooperatively serve to separate the rotation of the rotating spindle spline shaft (25) from the axial, linear motion imparted by the linear actuator (22).

A pair of angular thrust bearings (27) and linkages in a rotary ball-spline assembly (26) connect both an inner rotating section (26a) and an outer translating section (26b) of the rotary ball-spline assembly (26). The rotation of the inner rotating/translating section (26a) of the rotary ball spline assembly (26) is driven by the rotating spindle spline shaft (25).

The rotary ball-spline bearing assembly (26) couples the rotation of the main rotating spindle spline shaft (25) to the linear motion of the main body ball-spline shaft (7). In so doing, the oscillating linear motion (linear displacement) imparted by the linear actuator (22) is superimposed onto the rotary motion of the main spindle ball spline shaft (25), to cause cutting tool (or workpiece, as appropriate) (32) to move in both a rotational manner and a linear manner.

The embodiment 300 of FIG. 3 enables simultaneous rotational motion and linear motion of a tool or work material (32) held by a clamp (31). The clamp (31) is rigidly connected to the rotating/translating inner section (26a) of the rotary ball-spline bearing assembly (26) by a series of annular screws (30). The translating/non-rotating outer section (26b) of the rotary ball-spline bearing assembly (26) is rigidly connected to the main body ball-spline shaft (7) by a shaft coupling (33).

The shaft coupling (33) is clamped to the main body ball-spline shaft (7) by two screws (34) located 180 degrees apart. The translating/non-rotating section (26b) of the rotary ball-spline bearing assembly (26) is fastened to the shaft coupling (33) by a series of annular screws (27a).

The rotation of the main body housing (3) is prevented by a torque arm (20) that is rigidly connected to the main body housing (3). The torque arm (20) is coupled to a fixed block (19) that is rigidly mounted to a fixed machine element (not shown). The torque arm (20) prevents any rotational motion of the main body housing (3).

Translational (linear) motion of the main body housing (3) is prevented by a thrust bearing housing (45) that is fastened to the main body housing (3) with a series of annular screws (11). The thrust bearing housing (45) contains an opposing pair of angular thrust bearings (12) that are pre-loaded to prevent any linear translation of the thrust bearing housing (45). The bearings (12) of the thrust bearing housing (45) are pressed over the spindle driver shaft (16) and held to position by the clamp ring (9) and the seating cap (14). The seating cap (14) is threaded into the thrust bearing housing (45) to remove clearance between the pair of angular contact bearings (12) and the clamp ring.

The spindle driver shaft (16) transmits rotary motion (torque) to the rotating spindle spline shaft (25). The spindle driver shaft (16) is rigidly connected to the rotating spindle spline shaft (25) by two mounting screws (18) located 180 degrees apart. The spindle driver shaft (16) is clamped directly to a rotating machine adapter (15). The machine adapter (15) can be mounted to the mating feature of a rotating spindle in a machine or other motor driver (not shown).

The spindle assembly includes provisions for the application of pressurized cutting fluids through the system by an axially extending central passageway (47) in the spindle driver shaft (16) and in the axially extending central passageway (42) that extends along the entire length of the rotating spindle spline shaft (25) as depicted by the solid arrows along the axis of the rotating spindle spline shaft (25). The main spindle driver shaft is sealed for application of pressurized cutting fluids using o-rings (17a) and (17b).

The linear actuator (22) is grounded internally and connected to an external controller (not shown) by an electrical and/or communication cable (21). The electrical and/or communication cable (21) is routed through an interior passageway, a stationary arm (20) attached to the main body housing (3) of the spindle system (300). The stationary arm (20) also provides a connection for supply of external compressed air that can be used to cool or internally pressurize the spindle assembly.

Figure 4:
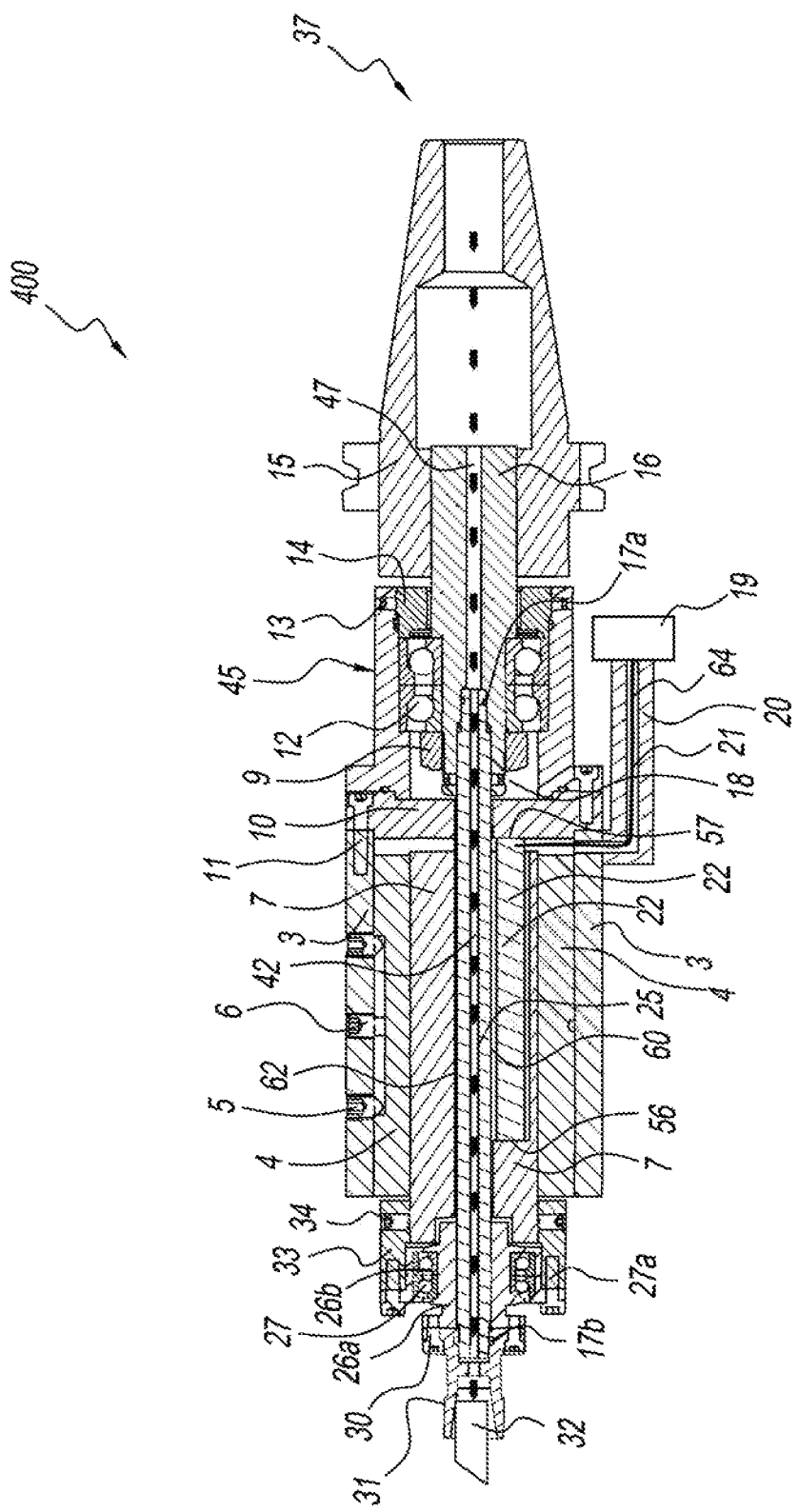
FIG. 4 is a sectional view of a third alternate embodiment machining system of the present invention.

The spindle assembly (400) in FIG. 4 includes a cylindrical axisymmetric, stationary main body housing (3) that contains a main body ball-spline bearing assembly comprised of a bearing nut (4) and a main body ball-spline shaft (7). The bearing nut (4), depicted as a ball-spline bearing nut, is fixedly coupled by being clamped to the stationary housing (3) by two fasteners, such as radially extending screws (5) located one side of the housing. The bearing nut (4) and main body ball-spline shaft (7) are lubricated through a grease port (6) accessible from the exterior of housing 3.

The main body ball-spline shaft (7) is coupled to a linear actuator (22) that is located off-axis (antisymmetric) from the main body ball-spine shaft (7). In this form depicted in FIG. 4, the linear actuator (22) has a non-cylindrical form. The linear actuator (22) includes a space between itself and rotating spindle spline shaft 25, so that the rotating spindle spline shaft (25) can move and rotate relative to the linear actuator (22).

The main body ball-spline shaft (7) prevents any torsion loads from being imposed upon on the linear actuator (22). The linear actuator (22) includes a second end (56) that is attached to the main body ball-spline and a first end (57) that is attached to the main body end-cap (10). A bore (62) through the main-body shaft (7) allows the rotating spindle spline shaft (25) to pass through the main-body ball-spline shaft (7) and to rotate within the bore (62). Through this arrangement, the rotation of the rotating spindle spline shaft (25) is independent from the linear motion imparted by the linear actuator (22).

The linear actuator (22) is attached at its second end 56 to one end of the main body ball-spline shaft (7). The first end (57) of the linear actuator (22) is connected to the end-face (10) of a thrust bearing housing (45) that is fastened to the main body cylindrical housing (3) by a series of annular screws.

The linear actuator (22) is located adjacent (asymmetrically) to the rotating spindle spline shaft (25) of the assembly and the rotating spindle spline shaft (25) passes through an axial bore (62) in the main body ball-spline shaft (7). The linear actuator (22) is preferably a piezo-electric actuator, linear motor, magnetostrictive actuator, or similar electric motor but may take some other form or design, such as a mechanical linear actuator.

The linear actuator (22) may also include an internal sensor to transmit feedback signals between the linear actuator (22) and an external controller (not shown). The linear actuator (22) may be housed in a casing and internally pre-loaded, so that it operates continuously in compression to prevent tension loads from being imposed on the linear actuator (22).

By integrating the linear actuator (22) in this manner, the rotation of the rotating spindle spline shaft (25) can be initially separated from the motion imparted by the linear actuator (22).

A pair of angular thrust bearings (27) and linkages in a rotary ball-spline bearing assembly (26) connect both an inner rotating section (26a) and an outer translating section (26b) of the rotary ball-spline assembly (26). The rotation of the inner rotating/translating section (26a) of the rotary ball spline assembly (26) is driven by the rotating spindle spline shaft (25). The rotary ball-spline bearing assembly (26) couples the rotational movement of the rotating spindle spline shaft (25) to the linear motion of the main body ball-spline shaft (7), which results in the oscillating linear motion (linear displacement) of the linear actuator (22) being superimposed onto the rotary motion of the rotating spindle spline shaft (25) so that the tool or work piece 32 has both rotary and linearly oscillating movement.

The proposed embodiment enables simultaneous rotational and linear motion of a tool or work material (32) held by a clamp (31). The clamp (31) is rigidly connected to both the rotating and translating (linearly moving) inner section 26a of the rotary ball-spline bearing assembly (26) by a series of annular screws (30). The translating/non-rotating outer section (26b) of the rotary ball-spline bearing assembly (26) rigidly connected to the main body ball-spline shaft (7) by a shaft coupling (33).

The shaft coupling (33) is clamped to the main body ball-spline shaft (7) by two screws (34) located 180 degrees apart. The translating/non-rotating outer section (26b) of the rotary ball-spline bearing assembly (26) is fastened to the shaft coupling (33) by a series of annular screws (27a). The rotation of the main body housing (3) is prevented by a torque arm (20) that is rigidly connected to the main body housing (3). The torque arm (20) is coupled to a fixed block (19) that is rigidly mounted to a fixed machine element (not shown). The torque arm prevents any rotary motion of the main body housing (3).

Translation (linear movement) of the main body housing (3) is prevented by a thrust bearing housing (45) that is fastened to the main body housing (3) with a series of annular screws (11). The thrust bearing housing (45) contains an opposing pair of angular thrust bearings (12) that are pre-loaded to prevent any linear translation of the thrust bearing housing (45).

The thrust bearing bearings (12) are pressed over the spindle driver shaft (16) and held to position by the clamp ring (9) and the seating cap (14). The seating cap (14) is threaded into the thrust bearing housing (45) to remove clearance between the pair of angular contact bearings (12) and the clamp ring. The spindle driver shaft (16) transmits rotary motion (torque) to the rotating spindle spline shaft (25).

The spindle driver shaft (16) is rigidly connected to the rotating spindle spline shaft (25) by two mounting screws (18) located 180 degrees apart. The spindle assembly (400) the spindle driver shaft (16) is clamped directly to a rotating machine adapter (15). The machine adapter (15) can be mounted to the mating feature of a rotating spindle in a machine or other motor driver (not shown). The spindle assembly (400) includes provisions for the application of pressurized cutting fluids through the system by providing an axially extending central passageway (47) in the spindle driver shaft (16) and along the axis of the rotating spindle spline shaft (25) through an axially extending passageway (42) formed in the rotating spindle spline shaft (25) as depicted by the solid arrows along the axis of the rotating spindle spline shaft (25).

The rotating spindle spline shaft (25) is sealed for application of pressurized cutting fluids by using o-rings (17a) and (17b). The linear actuator (22) is grounded internally and connected to an external controller by an electrical and/or communication cable (21). The electrical and/or communication cable (21) is routed through a stationary arm (20) attached to the main body housing (3) of the spindle system. The stationary arm (20) also provides a connection for supply of external compressed air that can be used to cool or internally pressurize the spindle assembly (400).

What is claimed is:

1. A modulating tool holder for holding one of a tool and workpiece, the tool holder being configured for mounting to a driving member of a machining device, the tool holder comprising:
   a housing;
   a tool holder first end and a tool holder second end, a central axis extending between the tool holder first end and the tool holder second end, the tool holder first end including a coupler for coupling the tool holder to the driving member of the machining device, and the tool holder second end including a clamp for releasably holding the one of a tool and workpiece;
   a rotatable spindle member extending generally axially in the tool holder and being functionally coupled to the clamp for imparting a rotational movement to the clamp, the rotatable spindle member including a spindle first end disposed relatively closer to the tool holder first end, and a spindle second end disposed relatively closer to the tool holder second end, and an axially extending central fluid passageway extending between the spindle shaft first end and the spindle shaft second end;

a linear actuator disposed radially exteriorly of the spindle of the rotatable spindle member and being functionally decoupled from a torsional load of the rotatable spindle member, and wherein the linear actuator is functionally coupled to the clamp for imparting an oscillating linear movement to the clamp, and wherein the linear actuator remains rotationally stationary; and wherein the linear actuator and rotatable spindle member are configured for together simultaneously imparting both a rotational and an oscillating linear movement to the clamp.

2. The tool holder of claim 1 wherein the tool holder imparts a sinusoidal oscillating linear movement to the clamp and to the at least one of a tool and workpiece held by the clamp.

3. The tool holder of claim 1 further comprising a shaft member functionally coupled to the linear actuator for linear movement by the linear actuator.

4. The tool holder of claim 3 further comprising a biasing member coupled to the shaft member for exerting a force against the shaft member.

5. The tool holder of claim 4 further comprising a compression member coupled to the biasing member for exerting a compressive force against the biasing member.

6. The tool holder of claim 3 further comprising a biasing member coupled to the shaft member for exerting a compressive pre-load on the shaft that is transmittable to the linear actuator to cause the linear actuator to operate under a compressive load.

7. The tool holder of claim 1 further comprising a shaft member functionally coupled between the linear actuator and the clamp for de-coupling torsion loads upon the linear actuator.

8. The tool holder of claim 7 further comprising a rotary assembly functionally coupled between the shaft and the clamp to impart linear movement of the shaft member to the clamp.

9. The tool holder of claim 8 wherein the rotary assembly includes a rotating and linearly movable section functionally coupled to the rotatable spindle member, and non-rotating, linearly moving section functionally coupled to the shaft member.

10. The tool holder of claim 9 wherein the rotary assembly includes thrust bearings coupled between the rotating linearly movable section and the non-rotating linearly movable section.

11. The tool holder of claim 1 further comprising a shaft member functionally coupled to the linear actuator for movement by the linear actuator, wherein the rotatable spindle member is independently rotationally movable relative to the shaft member and the linear actuator.

12. The tool holder of claim 1 wherein the linear actuator includes a first end and a second end, further comprising a shaft member coupled to the second end of the linear actuator for linear movement by the linear actuator, and a rotary assembly functionally coupled to the first end of the linear actuator.

13. The tool holder of claim 1 further comprising a rotary assembly functionally coupled between the clamp and the linear actuator for enabling the linear movement of the linear actuator to cause linear movement of the clamp.

14. The tool holder of claim 1 further comprising a shaft member functionally coupled between the linear actuator and the clamp, the shaft member including an axially extending bore for receiving the rotatable spindle member in a manner wherein the rotatable spindle member can rotate independently of the shaft member.

15. The tool holder of claim 1 wherein the linear actuator comprises a non-cylindrical linear actuator that includes an axis that is not co-linear with an axis about which the rotatable spindle member rotates.

16. The tool holder of claim 1 further comprising a thrust bearing assembly coupled to the housing for preventing linear motion of the housing.

17. The tool holder of claim 1, further comprising:
a thrust bearing assembly coupled to the housing for reducing linear motion of the housing, and
a torque arm coupled to the housing for preventing rotational movement of the housing.

18. The tool holder of claim 1, further comprising a shaft member functionally coupled to the linear actuator for linear movement by the linear actuator, wherein the shaft member further comprises a ball-spline shaft configured for de-coupling the imposition of torsion loads between the spindle member and the linear actuator.

19. The tool holder of claim 1 further comprising a torque arm coupled to the housing for preventing rotational movement of the housing, the torque arm including an internal passageway configured for receiving a cable and conducting the cable from a position exterior of the housing to the linear actuator without engaging any rotating members or surfaces.

20. A modulating tool holder, comprising:
a tool holder including a tool holder first end and a tool holder second end, wherein the tool holder includes a central axis extending between the tool holder first end and the tool holder second end, wherein the tool holder first end includes a coupler for coupling the tool holder to a driving member of a machining device, and wherein the tool holder second end includes a clamp for releasably holding at least one of a tool and a workpiece;
a rotatable spindle member extending generally axially along the central axis of the tool holder, wherein the rotatable spindle member is operably coupled to the clamp in a manner sufficient to impart a rotational movement to the clamp; and
a linear actuator disposed radially exteriorly of the spindle of the rotatable spindle member, wherein the linear actuator is configured to impart an oscillating linear movement to the clamp, wherein the linear actuator is functionally decoupled from a torsional load of the rotatable spindle member, and wherein the linear actuator remains rotationally stationary during rotation of the rotatable spindle member.

21. The modulating tool holder of claim 20, wherein the rotatable spindle member includes a spindle first end disposed relatively closer to the tool holder first end, and a spindle second end disposed relatively closer to the tool holder second end, and an axially extending central fluid passageway extending between the spindle shaft first end and the spindle shaft second end, and wherein the central fluid passageway is configured to pass a pressurized cutting fluid therethrough.

22. The modulating tool holder of claim 21, further comprising a stationary torque arm coupled between a rotationally stationary housing of the tool holder and a stationary portion of a machining device, and wherein an electrical connection to the linear actuator is provided through the stationary torque arm.

* * * * *